(12) United States Patent
Johnson et al.

(10) Patent No.: US 9,106,317 B1
(45) Date of Patent: Aug. 11, 2015

(54) ASSIGNMENT AND SETUP IN POWER LINE COMMUNICATION SYSTEMS

(75) Inventors: Roland Johnson, Breezy Point, MN (US); Damian Bonicatto, Pequot Lakes, MN (US); Robert Zeppetelle, Brainerd, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 418 days.

(21) Appl. No.: 13/334,559

(22) Filed: Dec. 22, 2011

(51) Int. Cl.
*G08C 15/06* (2006.01)
*H04B 3/54* (2006.01)

(52) U.S. Cl.
CPC . *H04B 3/544* (2013.01); *H04B 3/54* (2013.01)

(58) Field of Classification Search
None
See application file for complete search history.

(56) References Cited

U.S. PATENT DOCUMENTS

| | | | |
|---|---|---|---|
| 5,581,229 A | 12/1996 | Hunt | |
| 6,154,488 A | 11/2000 | Hunt | |
| 6,177,884 B1 | 1/2001 | Hunt et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,346,463 B2 | 3/2008 | Petite et al. | |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |
| 8,144,816 B2 | 3/2012 | Bonicatto et al. | |
| 8,144,820 B2 | 3/2012 | Bonicatto | |
| 8,194,789 B2 | 6/2012 | Wolter et al. | |
| 8,238,263 B2 | 8/2012 | Kohout et al. | |
| 2008/0304595 A1 | 12/2008 | Haug et al. | |
| 2009/0140880 A1* | 6/2009 | Flen et al. | 340/870.02 |
| 2011/0121952 A1 | 5/2011 | Bonicatto et al. | |
| 2011/0176598 A1 | 7/2011 | Kohout et al. | |
| 2011/0218686 A1 | 9/2011 | McHann, Jr. et al. | |
| 2011/0249678 A1 | 10/2011 | Bonicatto et al. | |
| 2012/0057592 A1* | 3/2012 | Zeppetelle et al. | 370/390 |

(Continued)

*Primary Examiner* — Jae Y Lee
*Assistant Examiner* — Alan Lindenbaum
(74) *Attorney, Agent, or Firm* — Crawford Maunu PLLC

(57) ABSTRACT

Aspects of the present disclosure are directed toward a system that includes a plurality of endpoint devices. Each endpoint device can be configured and arranged to monitor a plurality of communication channels carried over power distribution lines for data communications. The endpoint can detect setup communications that contain an endpoint identifier (ID) matching the endpoint. The endpoint then stores or assigns the organization ID (obtained from the detected communications) to itself. The endpoint configures itself to respond to subsequent operational communications based upon the organization ID. A command center is configured and arranged to transmit setup communications to endpoint devices. The setup communications can include one or more endpoint identifiers and the organization ID. The command center can also transmit operational communications to the plurality endpoint devices, the operational communications including the organization ID.

20 Claims, 2 Drawing Sheets

(56) References Cited

U.S. PATENT DOCUMENTS

2012/0076212 A1  3/2012  Zeppetelle et al.
2012/0084559 A1  4/2012  Bonicatto
2012/0106664 A1  5/2012  Bonicatto et al.
2012/0109663 A1* 5/2012  Floyd et al. .................... 705/1.1
2012/0201155 A1* 8/2012  Du et al. ........................ 370/252

* cited by examiner

ASSIGNMENT AND SETUP IN POWER LINE COMMUNICATION SYSTEMS

BACKGROUND

Service providers utilize distributed networks to provide services to customers over large geographic areas. For example, power companies use power distribution lines to carry power from one or more generating stations (power plants) to residential and commercial customer sites alike. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices of customer sites.

Communications providers may utilize a distributed communications network to provide communications services to customers. Similarly, power companies utilize a network of power lines, meters, and other network elements to provide power to customers throughout a geographic region and to receive data from the customer locations (e.g., including, but not limited to, data representing metered utility usage). A system can provide these reporting functions using a set of data-collecting devices (collectors) that are designed to communicate with nearby endpoint devices. However, data communication between a command center, collectors and many thousands of endpoint devices over power distribution lines can be a particularly challenging issue. The sheer number of endpoint devices contributes to a host of issues including, but not limited to, the setup and configuration of the endpoint devices and associated assignment of command centers and communication channels.

SUMMARY

The present disclosure is directed to systems and methods for use with endpoint channel configuration and setup. These and other aspects of the present disclosure are exemplified in a number of illustrated implementations and applications, some of which are shown in the figures and characterized in the claims section that follows.

Certain embodiments of the present disclosure are directed toward a downstream endpoint receiver with the capability of receiving data on a plurality of channels. The endpoint receiver listens to the plurality of channels until it detects its endpoint identifier (ID) in a communication. In response, the endpoint receiver retrieves an organization ID from the communication. The endpoint can continue to monitor the plurality of channels, but will respond to communications containing the organization ID, while effectively ignoring communications containing a different organization ID.

Various embodiments allow for an endpoint device to tune to a communication channel after receiving a communication on the channel that included its endpoint identifier. This tuning to a channel can allow the endpoint to respond to certain types of communications only if they are received on the tuned channel. For instance, the endpoint may respond to diagnostic communications only if they are received on the channel. In various embodiments, however, the endpoint can respond to other types of communications regardless of the channel (although the endpoint may not respond for other reasons, such as an invalid organization ID).

Embodiments of the present disclosure are also directed toward a system that includes a plurality of endpoint devices. Each endpoint device can be configured and arranged to monitor a plurality of communication channels carried over power distribution lines for data communications. The endpoints can detect setup communications that contain an endpoint identifier (ID) matching the endpoint. The endpoint can then store or assign the organization ID (obtained from the detected communications) to itself. The endpoint configures itself to respond to subsequent operational communications based upon the organization ID. A command center is configured and arranged to transmit setup communications to endpoint devices. The setup communications can include one or more endpoint identifiers and the organization ID. The command center can also transmit operational communications to the plurality of endpoint devices, the operational communications including the organization ID.

Other embodiments are directed toward a device, or method of using a device, in which first signals are received for a plurality of channels, and the first signals are carried on a power distribution line. The first signals are processed to generate first data for each of multiple channels of the plurality of channels. The generated first data is compared, for each channel, with a local endpoint identifier. In response to matching the first data for a first channel of the plurality of channels with the local endpoint identifier, an organization identifier contained in the decoded data for the first channel is stored in a memory. Subsequent signals are then received for the plurality of channels, and the subsequent signals are carried on the power distribution line. The subsequent signals are then processed to generate subsequent data for each channel of the plurality of channels. The generated subsequent data for each channel is compared to the stored organization identifier. In response to matching the subsequent data for a second channel of the plurality of channels with the organization identifier, a command in the subsequent data for the second channel can be processed and followed.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
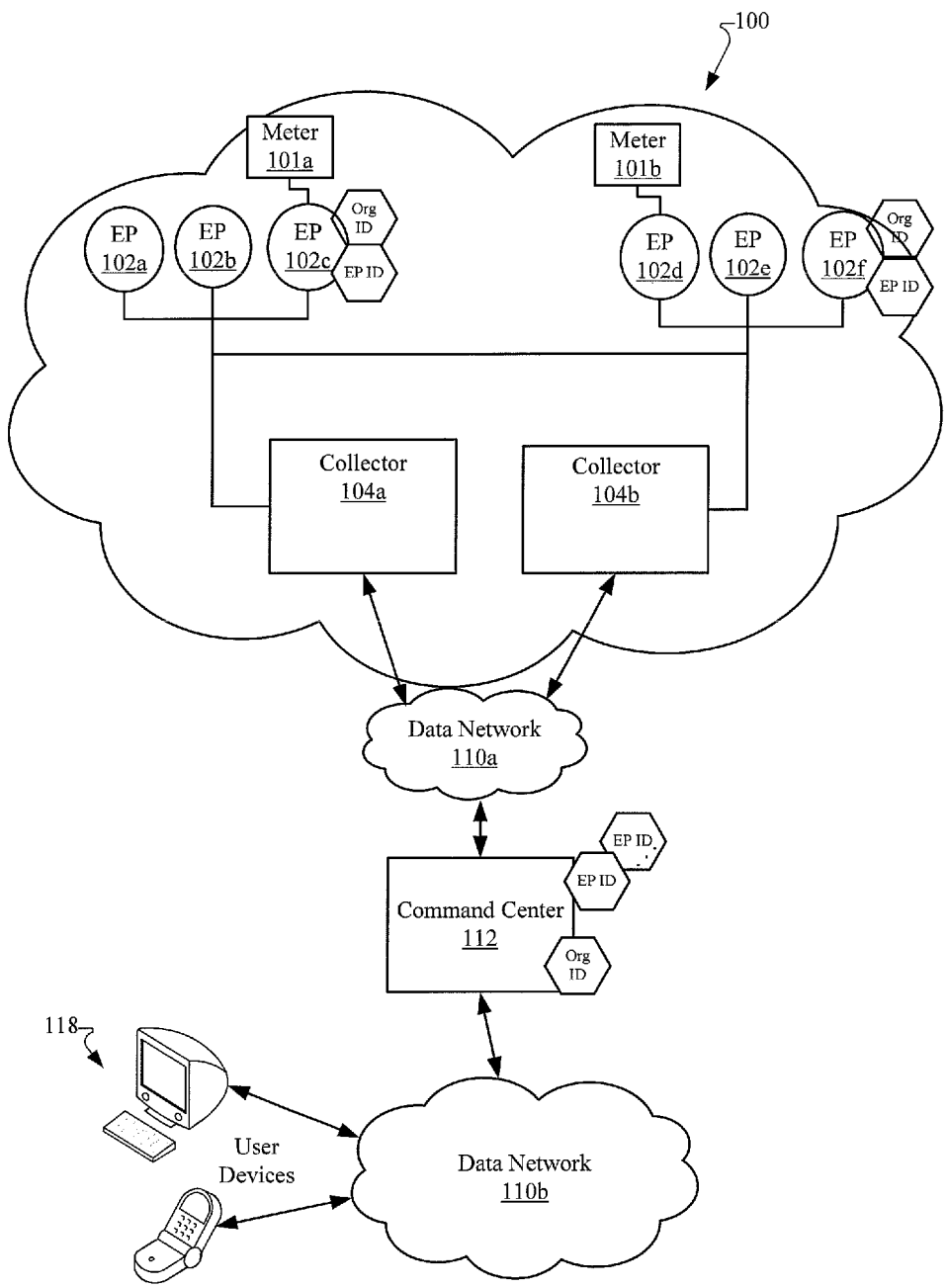
FIG. 1 is a block diagram of an example network environment 100 in which endpoints 102 communicate data with collector units 104, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for setup of a system with numerous endpoint devices communicating over power distribution lines. While the present disclosure is not necessarily limited to such applications, various aspects of the disclosure may be appreciated through a discussion of various examples using this context.

Embodiments of the instant disclosure are directed to endpoint devices configured and arranged to select and respond to selected channels. The endpoint devices are configured to listen on multiple channels. Two different identifiers (IDs) can be used to coordinate communications. A first identifier can uniquely identify the endpoint relative to other endpoints in the system. A second identifier can identify an organization to which the endpoint is assigned. The endpoint can be configured to store an organization ID in response to receiving a communication having the endpoint's unique ID and the organization's ID.

Certain embodiments of the present disclosure are directed toward a downstream endpoint receiver with the capability of receiving data on multiple channels. The endpoint receiver listens to the multiple channels until it detects its endpoint identifier (ID) in a communication. In response, the endpoint receiver retrieves an organization ID from the communication. The endpoint can continue to monitor the multiple channels, but will respond to communications containing the organization ID, while effectively ignoring communications containing a different organization ID.

Various embodiments allow for an endpoint device to tune to a communication channel after receiving a communication on the channel that included its endpoint identifier. This tuning to a channel can allow the endpoint to respond to certain types of communications only if they are received on the tuned channel. For instance, the endpoint may respond to diagnostic communications only if they are received on the channel. In various embodiments, however, the endpoint can respond to other types of communications regardless of the channel (although the endpoint may not respond for other reasons, such as an invalid organization ID).

Embodiments of the present disclosure are also directed toward a system that includes a plurality of endpoint devices. Each endpoint device can be configured and arranged to monitor multiple communication channels carried over power distribution lines for data communications. The endpoints can detect setup communications that contain an endpoint identifier (ID) matching the endpoint. The endpoint can then store or assign the organization ID (obtained from the detected communications) to itself. The endpoint configures itself to respond to subsequent operational communications based upon the organization ID. A command center is configured and arranged to transmit setup communications to endpoint devices. The setup communications can include one or more endpoint identifiers and the organization ID. The command center can also transmit operational communications to the plurality endpoint devices, the operational communications including the organization ID.

Other embodiments are directed toward a device, or method of using a device, in which first signals are received for a plurality of channels, and the first signals are carried on a power distribution line. The first signals are processed to generate first data for each of multiple channels of the plurality of channels. The generated first data is compared, for each channel, with a local endpoint identifier. In response to matching the first data for a first channel of the plurality of channels with the local endpoint identifier, an organization identifier contained in the decoded data for the first channel is stored in a memory. Subsequent signals are then received for the plurality of channels, and the subsequent signals are carried on the power distribution line. The subsequent signals are then processed to generate subsequent data for each channel of the plurality of channels. The generated subsequent data for each channel is compared to the stored organization identifier. In response to matching the subsequent data for a second channel of the plurality of channels with the organization identifier, a command in the subsequent data for the second channel can be processed and followed.

FIG. 1 is a block diagram of an example network environment 100 in which endpoints 102 communicate data with collector units 104, consistent with embodiments of the present disclosure. The network environment 100 includes a service network in which a plurality of endpoints 102a-102f are coupled (e.g., communicatively coupled) to collector units 104a, 104b. Consistent with embodiments of the present disclosure, the endpoints 102 can provide data from utility meters. For instance, data can be provided from power meters, gas meters and water meters, which are respectively installed in gas and water distribution networks. Moreover, while the present disclosure generally refers to the endpoints 102 as providing data utility (e.g., power) metering over a power distribution network, other data can also be communicated.

The endpoints 102 can be implemented to monitor and report various operating characteristics of the service network. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The endpoints 102 report the operating characteristics of the network over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be transmitted using power line communication networks that allocate available bandwidth between endpoints according to an orthogonal frequency division multiple access (OFDMA) spectrum allocation technique or another channel allocation technique.

When the endpoints 102 are implemented in connection with power meters in a power distribution network, the endpoints transmit reporting data that specify updated meter information that can include measures of total power consumption, power consumption over a specified period of time, peak power consumption, instantaneous voltage, peak voltage, minimum voltage and other measures related to power consumption and power management (e.g., load information). Each of the endpoints can also transmit other data, such as status data (e.g., operating in a normal operating mode, emergency power mode, or another state such as a recovery state following a power outage).

In FIG. 1, endpoints 102a-102c and 102d-102f transmit symbols over communications channels to collector units 104a, 104b, respectively. The collector units 104 can include circuitry (e.g., including one or more data processors) that is configured and arranged to communicate with the endpoints over power distribution lines. The collector units 104 can also include circuitry for interfacing with a command center 112. The interface to the command center 112 can be implemented using a variety of different communication networks including, but not limited to, a wide-area network (WAN) using Ethernet.

According to certain embodiments of the present disclosure, the collectors are installed in substations and used to control bidirectional communication with both the command center 112 (e.g., located at a utility office) and endpoints (e.g., located at metering locations for customer sites). This messaging to the endpoints can be sent to an individual endpoint, or broadcast simultaneously to a group of endpoints connected to the collectors 104. These broadcasts can be sent to all endpoints or they can be targeted to certain groups of endpoints. The targeting of groups of endpoints can be accomplished by assigning endpoints with group IDs that are shared between endpoints in the same group. Consistent with certain embodiments, the collectors 104 are built according to an industrial-grade computer specification in order to withstand the harsh environment of a substation.

Downstream transmissions to the endpoints 102 can be initiated at a command center 112. Command center 112 can be operated by a particular organization (e.g., a power utility company). Embodiments of the present disclosure are directed toward the use of an organization ID to facilitate downstream communications to endpoints 102. There can be several different organizations and command centers 112, each having respective and different endpoints 102. This can be particularly useful for allowing communications to be directed toward groups of endpoints (e.g., using a broadcast message) rather than individually addressing endpoint devices. Downstream communications from one organization can sometimes be heard/received by endpoints of another organization. For instance, the collector units 104 can be located within several power substations and several of the substations might be operated by different organizations. Surprisingly, signals transmitted by the collector units 104 can sometimes propagate from a substation back through its transformer and onto the substations input power distribution lines (e.g., during a backfeed situation). This can cause the signals to propagate to another substation that could be owned by a different organization. Accordingly, aspects of the present disclosure are also directed toward assignment of organization IDs to endpoint devices.

Each command center 112 can store a list of endpoint devices associated with a particular organization ID. The command center 112 can generate a series of transmissions designed to configure these endpoints 102 to respond to commands that include this organization ID. For instance, the command center 112 can initiate a series of downstream communications that contain endpoint IDs and the organization ID. The collectors 104 receive these communications and send corresponding transmissions to endpoint devices 102 over the power distribution lines. Endpoints 102 receive and decode communications received over the power distribution lines. If the decoded data includes the endpoint's local ID, the endpoint 102 will store the received organization ID. Subsequently, the endpoint 102 will respond to communications that include this stored organization ID.

In certain embodiments of the present disclosure, the endpoint 102 can assign a primary channel to listen for communications. The endpoint 102 can select this primary channel based upon the channel carrying the communication with the endpoint's local ID. The endpoint monitors this channel for subsequent (periodic) messages. If the endpoint ceases to detect the subsequent messages, it can then begin listening for a new channel. In particular implementations, the subsequent messages include a timing synchronization message.

In various embodiments of the present disclosure, the collector(s) 104 can receive data from many different endpoints 102 while storing the data in a local database. A collector can also take action based on the data received from the endpoints and transmit data received from the endpoints to a command center 112. For example, in a PLC network, the command center 112 can receive data indicating that power usage is significantly higher in a particular portion of a power network than in other portions of the power network. Based on this data, the command center 112 can allocate additional resources to that particular portion of the network (i.e., load balance) or provide data specifying that there is increased power usage in the particular portion of the power network.

Consistent with certain embodiments, the command center 112 provides an interface that allows user devices 118 access to data received from endpoints 102. For example, the user devices might be owned by utility provider operators, maintenance personnel and/or customers of the utility provider. For example, data identifying the increased power usage described above can be provided to a user device 118 accessible by the network operator, who can, in turn, determine an appropriate action regarding the increased usage. Additionally, data identifying a time-of-use measure and/or a peak demand measure can also be provided to user devices 118. Similarly, if there has been a power outage, the command center 112 can provide data to user devices 118 that are accessible by customers to provide information regarding the existence of the outage and potentially provide information estimating the duration of the outage.

The data networks 110a and 110b can each be a wide area network (WAN), local area network (LAN), the Internet, or any other communications network. The data networks 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. In certain embodiments, the data networks 110 overlap with each other. In some embodiments, they can be the same data network. For instance, each network 110 could provide data, at least in part, over the Internet.

Symbols from a particular endpoint may be transmitted over anyone of thousands of communications channels in a PLC system. For example, each endpoint can be assigned a particular channel using OFDMA or another channel allocation technique. Channel assignments for the endpoints 102a-102c, 102d-102f that communicate with particular collectors 104a, 104b can be stored, for example, in an communications database that is accessible to the command center 112 and/or the collectors 104a, 104b.

Consistent with embodiments of the present disclosure, each collector 104 can be configured to be in communication with thousands of endpoints 102 and there can be thousands of collectors 104 in connection with the command center 112. For example, a single collector can be configured to communicate with over 100,000 endpoint devices and a command center can be configured to communicate with over 1,000 collectors. Thus, there can be millions of total endpoints and many thousands of these endpoints can communicate to a common collector over a shared power distribution line. Accordingly, embodiments of the present disclosure are directed toward coordinating communications to accommodate endpoints that receive communications originating from multiple, different organizations and related considerations.

Figure 2:
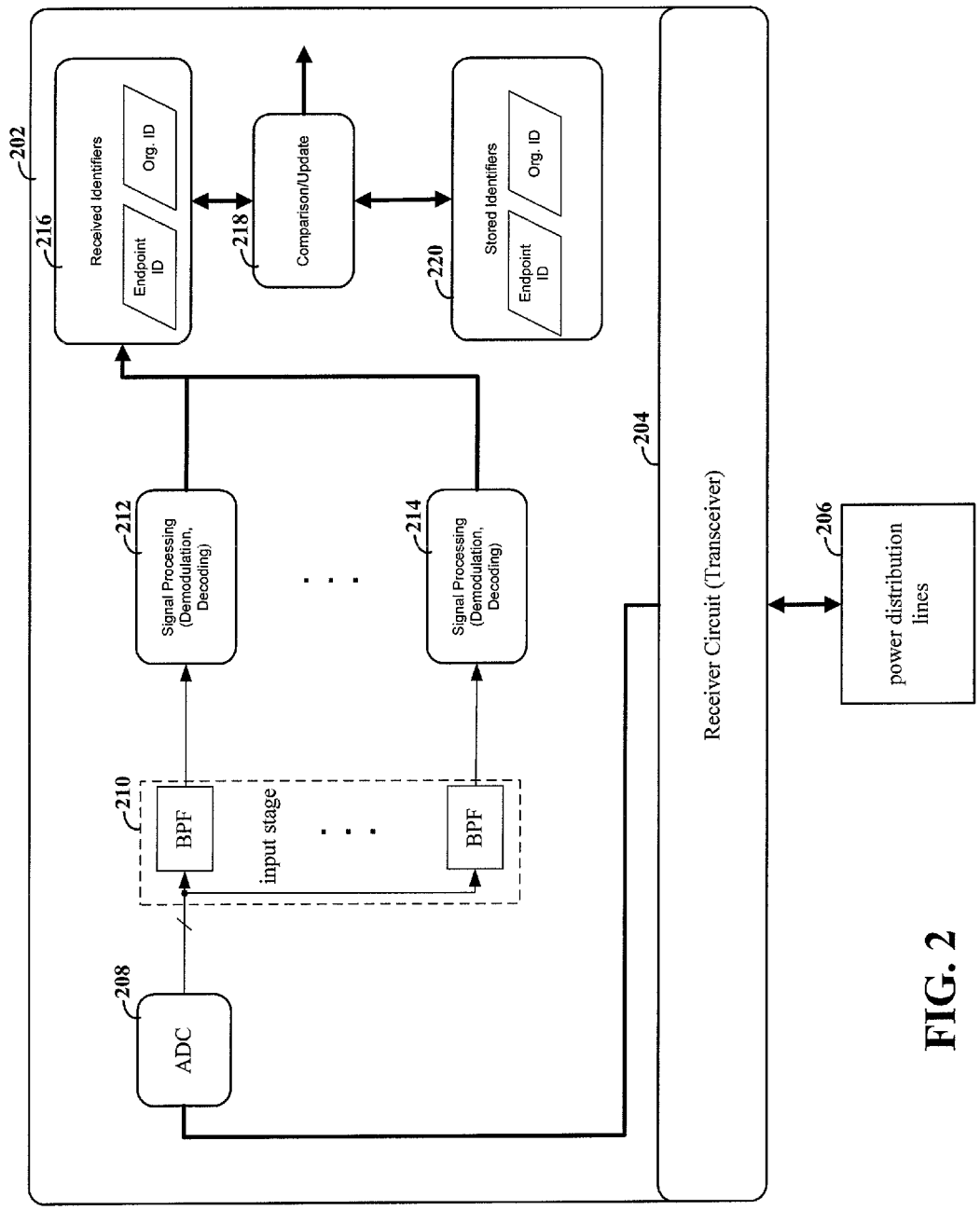
FIG. 2 depicts a block diagram of an endpoint device, consistent with embodiments of the present disclosure.

FIG. 2 depicts a block diagram of an endpoint device, consistent with embodiments of the present disclosure. Endpoint device 202 can be configured to receive (and transmit) communications on power distribution lines 206. Receiver (transceiver) circuit 204 provides an interface between the processing components of endpoint device 202 and the power distribution lines 206.

Analog-to-digital converter (ADC) 208 converts an analog signal received from receiver circuit 204 into a digital form. The signal processing components of the endpoint 202 can be configured to receive communications over multiple different frequency channels. In one embodiment, the endpoint can receive and decode ten different channels. Other embodiments allow for 20 different channels. More channels could also be allowed depending upon the system parameters (e.g., bandwidth, filtering and processing power).

To facilitate the use of multiple frequencies, endpoint 202 can perform filtering for the different channels. For instance, input stage 210 can include one or more filters corresponding to the different frequencies of the channels. In a particular application, these filters can include band-pass filters (BPFs). Endpoint 202 can then perform signal processing 212 and 214 on the filter signals. This processing can include, but is not necessarily limited to, demodulation of symbols and decoding of the symbols into data bits. One particular embodiment relates to modulation based upon quadrature phase shift keying (QPSK). Other encoding protocols are also possible (e.g., amplitude shift keying, differential phase shift keying or frequency shift keying). Various embodiments use channel frequencies that are orthogonal to one another.

The endpoint 202 can then check the decoded data bits for an endpoint identifier and organization ID (received IDs 216). These IDs can represent the destination endpoint device and the source organization for the communication. The endpoint 202 includes a local storage 220. This local storage 220 can be used to store the unique endpoint ID for endpoint 202 and can also store the organization ID. In certain embodiments of the present disclosure, the local storage 220 can be implemented using multiple memory circuits, one for each of the unique endpoint ID and the organization ID. For instance, the unique endpoint ID can be stored in a non-volatile memory circuit and/or read-only-memory (ROM) circuit, such as an Electrically Erasable Programmable Read-Only Memory (EEPROM). The memory device can be programmed to include the unique endpoint ID before the endpoint is installed in the field, such as during the manufacturing process. The organization ID can be stored in another memory circuit that is write-accessible and can be volatile or non-volatile. There are various other possibilities for the memory circuit(s) including, but not necessarily limited to, storing the unique endpoint ID in a write-accessible memory and/or using a single memory circuit for both IDs.

Comparison/update module 218 compares received IDs against the stored IDs. Decisions on whether or not to process the received data can then be made based upon a match or lack of a match between IDs.

When an endpoint 202 is first deployed or otherwise in a condition to be setup, the endpoint 202 might not have an (valid) organization ID stored in the local storage 220. Comparison/update module 218 indicates a match to the unique endpoint ID, then the corresponding organization ID can be stored in local storage 220 and used for validating subsequent communications.

Consistent with certain embodiments of the present disclosure, the system is configured to transmit time packets to synchronize clocks in the endpoints. These time packets are sent periodically (e.g., every five minutes) and contain the organization ID. In certain embodiments, an endpoint 202 can be configured to listen only to channels with the organization ID. When, however, the endpoint 202 ceases to receive time packets on the listened-to channels, the endpoint 202 can search other channels for the organization ID. This can be particularly useful for providing an endpoint-managed mechanism for switching channels.

Other embodiments of the present disclosure are directed toward endpoint devices that are configured and arranged to receive communication signals (and subsequently demodulate and decode data from the signals) on more than one channel at the same time. Moreover, the endpoint devices can be configured to detect the presence of an organization ID on more than one channel. The endpoint devices can then process the corresponding data for each of the channels corresponding to the organization ID. For instance, each channel can carry a separate data stream (e.g., one channel can contain a first data stream with normal maintenance data while a second channel can contain a second data stream with updates or configuration commands). In another instance, a single data stream can be transmitted across more than one channel, thereby providing additional bandwidth. In some embodiments, the endpoints can be configured and arranged to receive redundant versions of a data stream on more than one channel. This can be particularly useful for validating the data and/or otherwise improving the reliability of the communications.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. Accordingly, the various components and processes shown in the figures can be implemented in a variety of circuit-based forms, such as through the use of data processing circuit modules.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression.

For example, block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on the modulation schemes used in downstream communications to the endpoints. Such modifications and changes do not depart from the true spirit and scope of the present disclosure, including aspects set forth in the following claims.

What is claimed is:

1. A system comprising:
  a plurality of endpoint devices, each endpoint device including circuitry configured and arranged to
    monitor a plurality of communication channels carried over power distribution lines,
    detect setup communications that contain an endpoint identifier (ID) matching the endpoint device,
    assign an organization ID, that uniquely identifies a power utility entity,
    receive data from the power utility entity and from a different utility entity wherein respective data is received from the power utility entity and from the different utility entity, the received data from the power utility entity includes the organization ID which uniquely identifies the power utility entity relative to the different utility entity, and
    respond to and process the received data and subsequent operational communications based upon recognition of the organization ID as matching the organization ID of the uniquely-identified power utility entity; and
  a command center configured and arranged to
    transmit setup communications to endpoint devices, the setup communications including one or more endpoint identifiers and the organization ID, and
    transmit operational communications to endpoint devices, the operational communications including the organization ID.

2. The system of claim 1, further including one or more collector devices configured and arranged to receive upstream communications from the command center and to transmit the communications on the power distribution lines.

3. The system of claim 1, wherein the plurality of communication channels are downstream communication channels, and wherein each endpoint device is configured and arranged to monitor the plurality of communication channels at the same time.

4. The system of claim 1, wherein each endpoint device is configured and arranged to monitor at least 10 downstream communication channels at the same time.

5. The system of claim 1, wherein the plurality of communication channels are downstream communication channels, and wherein each endpoint device is configured and arranged to ignore, after receiving the setup communications, operational communications that contain an organization ID which identifies the different utility entity other than the uniquely-identified power utility entity.

6. The system of claim 1, wherein the plurality of communication channels are downstream communication channels, and wherein each endpoint device is configured and arranged to receive periodic time packets that include the organization ID.

7. The system of claim 1, wherein the plurality of communication channels are downstream communication channels, and wherein the command center is configured and arranged to provide an interface for entering endpoint device IDs and to transmit the setup communications to endpoint devices in response to entered endpoint device IDs and wherein each endpoint device is configured and arranged to also respond to group IDs that are shared between endpoint devices.

8. The system of claim 1, wherein each endpoint device is configured and arranged to receive the organization ID in downstream communications to identify data received in downstream communications are from an organization corresponding to and processing information for several power substations, including power substations corresponding to the endpoint.

9. The system of claim 1, wherein each endpoint device is configured and arranged to receive the organization ID in downstream communications to identify data received in downstream communications are not from an organization corresponding to a power substation that is not assigned to be communicating with the endpoint device.

10. The system of claim 1, wherein each endpoint device is configured and arranged to receive a group ID and the organization ID, wherein the group ID corresponds to at least two of the plurality of endpoint devices affiliated with a common organization that corresponds to the organization ID.

11. The system of claim 1, wherein each endpoint device is configured and arranged to receive data, from an organization different than one corresponding to the organization ID, over power distribution lines in one or more of the plurality of communication channels.

12. A method comprising:
  receiving first signals for a plurality of channels from a power utility entity, the first signals carried on a power distribution line;
  processing the first signals to generate first data for each of the plurality of channels;
  comparing the generated first data for each channel with a local endpoint identifier;
  in response to matching the first data for a first channel of the plurality of channels with the local endpoint identifier, storing an organization identifier, that uniquely identifies a power utility entity, contained in the generated first data for the first channel;
  receiving subsequent signals for the plurality of channels, the subsequent signals carried on the power distribution line and receiving different-entity data from a different utility entity, wherein the subsequent signals from the power utility entity are conveyed with the organization identifier which uniquely identifies the power utility entity relative to the different utility entity;
  processing the subsequent signals to generate subsequent data for each channel of the plurality of channels;
  comparing the generated subsequent data for each channel with the stored organization identifier; and in response to matching the subsequent data for a second channel of the plurality of channels with the stored organization identifier, executing a command in the subsequent data for the second channel.

13. The method of claim 12, wherein the plurality of channels are downstream communication channels, and further including the step of processing diagnostic signals on the first channel.

14. The method of claim 12, wherein the plurality of channels are downstream communication channels, and further including the steps of, each responsive to the matching of the first data, processing diagnostic signals on the first channel and ignoring diagnostic signals on another channel.

15. The method of claim 12, wherein the plurality of channels are downstream channels that are orthogonal to one another.

16. The method of claim 12, further including the steps of receiving a group ID and, in response, processing the group ID and the organization ID as corresponding to an organization identified by the organization ID.

17. An endpoint device comprising:
   a receiver circuit configured and arranged to receive signals for a plurality of channels, the signals carried on a power distribution line;
   a processing circuit configured and arranged to
      process first signals from the receiver circuit to generate first data for each channel of the plurality of channels;
      compare the generated first data for each channel with an endpoint identifier;
      store, in response to matching the first data for a first channel of the plurality of channels with the endpoint ID, an organization ID, that uniquely identifies a power utility entity relative to a different utility entity, contained in the data for the first channel;
      process second signals, as sent from the power utility entity, at the receiver circuit to generate second data for each channel of the plurality of channels and wherein the receiver circuit receives the second signals as well as data from a different utility entity;
      compare the generated second data for each channel with the organization ID; and
      execute, in response to matching the second data for a second channel of the plurality of channels with the organization ID, a command in the second data, wherein the second data from the power utility entity includes the organization ID which uniquely identifies the power utility entity relative to the different utility entity.

18. The device of claim 17, wherein the plurality of channels are downstream communication channels, and wherein the processing circuit is configured and arranged to process the plurality of channels in parallel.

19. The device of claim 17, wherein the plurality of channels are downstream communication channels, and wherein the processing circuit is configured and arranged to process diagnostic signals received on the first channel and ignore diagnostic signals received on other channels.

20. The device of claim 17, wherein the processing circuit is further configured and arranged to receive a group ID which is processed as corresponding to an organization identified by the organization ID.

* * * * *